United States Patent
Evnine

(10) Patent No.: US 11,074,309 B2
(45) Date of Patent: *Jul. 27, 2021

(54) TEXT-TO-MEDIA INDEXES ON ONLINE SOCIAL NETWORKS

(71) Applicant: Facebook, Inc., Menlo Park, CA (US)

(72) Inventor: Ariel Benjamin Evnine, Oakland, CA (US)

(73) Assignee: Facebook, Inc, Menlo Park, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/511,758

(22) Filed: Jul. 15, 2019

(65) Prior Publication Data

US 2019/0340206 A1   Nov. 7, 2019

Related U.S. Application Data

(63) Continuation of application No. 14/952,707, filed on Nov. 25, 2015, now Pat. No. 10,387,511.

(51) Int. Cl.
| | |
|---|---|
| *G06F 16/00* | (2019.01) |
| *G06F 16/9535* | (2019.01) |
| *G06F 16/9536* | (2019.01) |
| *G06F 16/41* | (2019.01) |

(52) U.S. Cl.
CPC .......... *G06F 16/9535* (2019.01); *G06F 16/41* (2019.01); *G06F 16/9536* (2019.01)

(58) Field of Classification Search
CPC ................................................. G06F 16/9536
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |

(Continued)

OTHER PUBLICATIONS

Weston et al., "#TagSpace: Semantic Embeddings from Hashtags", Oct. 2014.

*Primary Examiner* — Ajith Jacob
(74) *Attorney, Agent, or Firm* — Baker Botts L.L.P.

(57) ABSTRACT

In one embodiment, a method includes receiving an input of n-grams from a client device, and identifying media items having keywords that match the n-grams from a media-item index that indexes a plurality of media items in association with respective keywords. A media-item score for each of the identified media items is calculated, and one or more of the identified media items having media-item scores greater than a threshold media-item score are returned to the client device.

20 Claims, 6 Drawing Sheets

(56) References Cited

U.S. PATENT DOCUMENTS

| | | |
|---|---|---|
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0279722 A1 | 9/2014 | Singh |
| 2014/0337421 A1 | 11/2014 | Edlund |
| 2017/0061294 A1 | 3/2017 | Weston |

TEXT-TO-MEDIA INDEXES ON ONLINE SOCIAL NETWORKS

PRIORITY

This application is a continuation under 35 U.S.C. § 120 of U.S. patent application Ser. No. 14/952,707, filed 25 Nov. 2015, which is incorporated herein by reference.

TECHNICAL FIELD

This disclosure generally relates to online social networks, and in particular, media items in communications on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may send data to a client device for suggesting a media item (e.g., a sticker, an emoji, an emoticon, a video file, an audio file, a GIF, an image) to a user. Such a suggestion may be helpful to a user in communicating over the online social network or on any other suitable platform (e.g., a text-messaging platform, an email platform). The social-networking system may receive from the client device of a user, an input from the user (e.g., a text string, a category selection) corresponding to one or more n-grams. The input need not originate from any action performed by the user, but may instead be automatically sent by the client device in response to a trigger (e.g., an event that occurs, a current time, a current location). The social-networking system may access a media-item index. The media-item index may index a plurality of media items and one or more keywords associated with each media item. Each of the keywords may have been extracted from communications on an online social network (e.g., posts, reshares, comments, private messages) made by users of the online social network. The social-networking system may identify media items from the media-item index. Each identified media item may be identified based on one or more of its associated keywords matching the one or more n-grams corresponding to the input of the user. The social-networking system may calculate a media-item score for each of the identified media items. The media-item score may be based on any suitable factor, such as a number of occurrences in which the media item has been used in communications on the online social network in connection with its matched keywords. The social-networking system may send, to the client device of the first user for display, data corresponding to identified media items having a media-item score greater than a threshold media-item score. This data may include the media item itself, presented as a content object. Alternatively, it may be a link to the media item (e.g., on a third-party website). The data may be presented to the user as one or more suggestions, one or more of which the user may select for insertion in a communication. The media-item index may be leveraged for uses other than suggesting media items. As an example and not by way of limitation, the keywords associated with a media item may inform the social-networking system of the contextual meanings associated with the media item and may be used to rank posts (e.g., a post consisting only of a picture of President Barack Obama may be ranked highly with respect to a search for the n-gram "barack obama"). This may be useful in the search context. The media-item index may serve generally as a lexicon of the most current language, slang, and memes, keeping pace with their evolution over time and reflecting the most current usage. As another example and not by way of limitation, the keywords associated with media items may provide for a wealth of analytical or polling data to an interested party (e.g., a company's logo may inform the company about user perceptions of the company).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
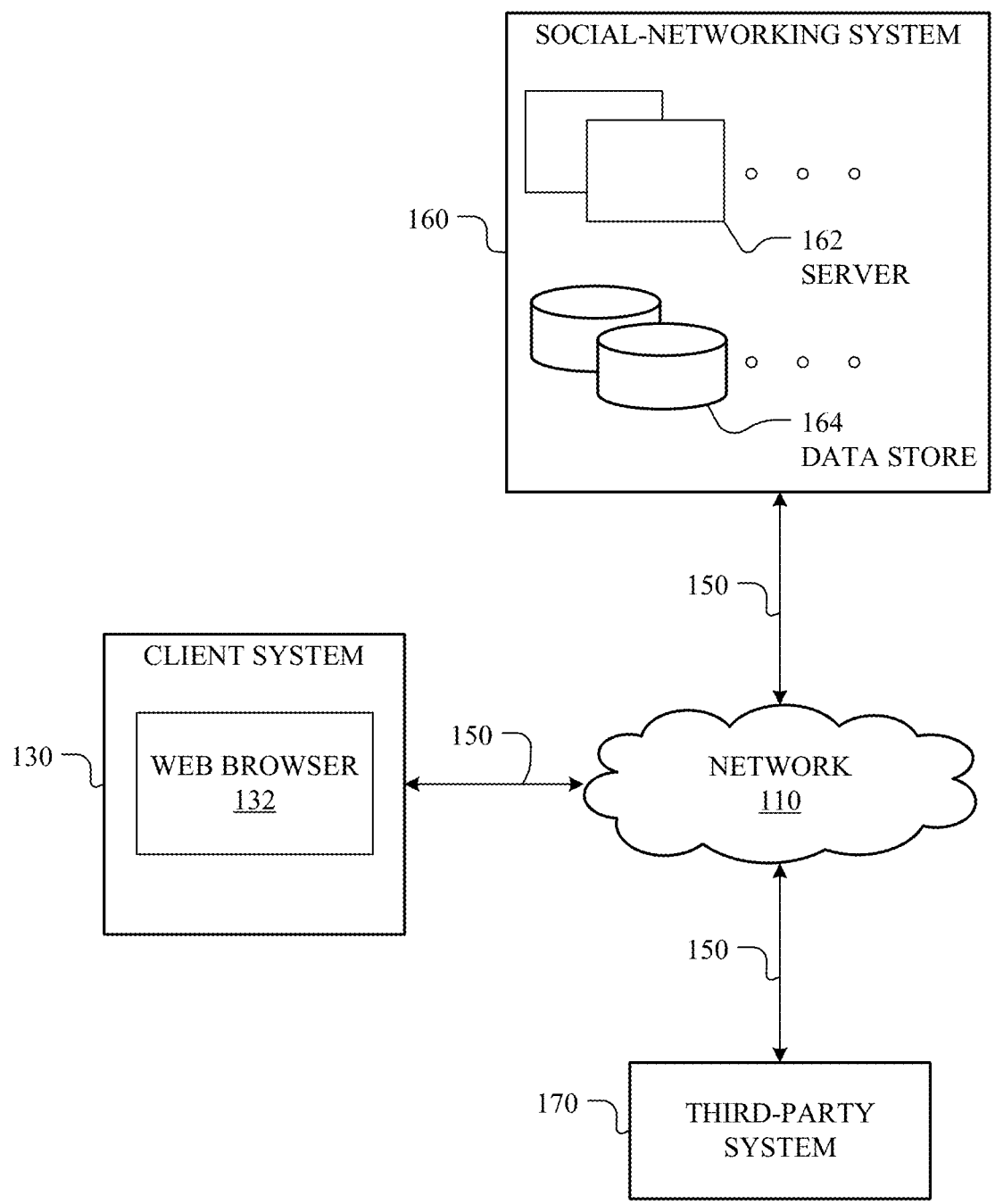
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts-, combinations of markup language and scripts, and the like. Herein, reference to a webpage encompasses one or more corresponding webpage files (which a browser may use to render the webpage) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
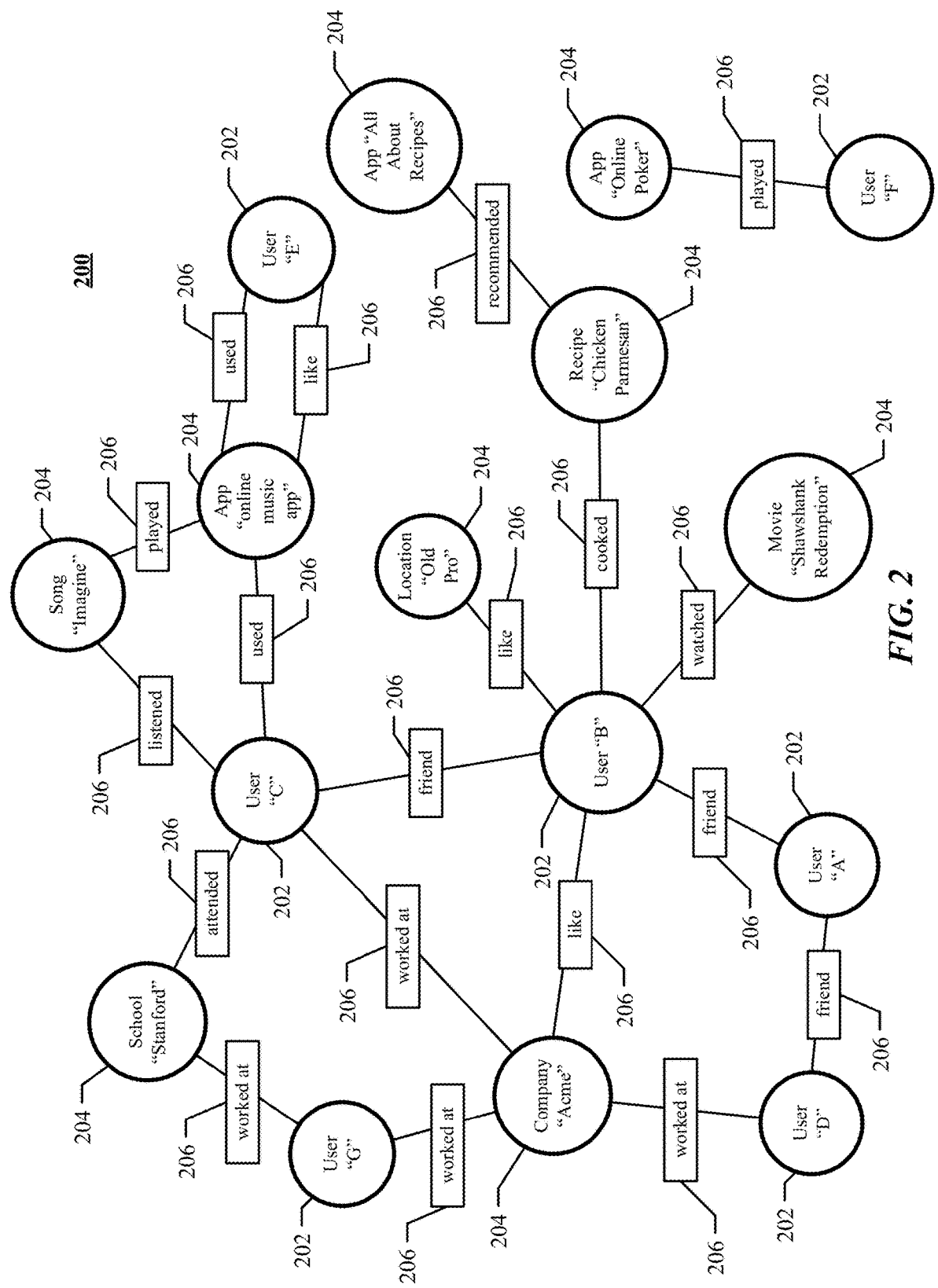
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party system 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (the third-party online music application) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "online music application").

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface or view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "poke bowl," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a user (e.g., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree connections friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the querying user and displayed in a drop-down menu (via, for example, a client-side typeahead process), where the querying user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Text-to-Media Indexes

In particular embodiments, the social-networking system 160 may send data to a client device for suggesting a media item (e.g., a sticker, an emoji, an emoticon, a video file, an audio file, a GIF, an image) to a user. Users may find such a suggestion helpful in communicating over the online social network or on any other suitable platform (e.g., a text-messaging platform, an email platform). Social-networking system 160 may use a media-item index to identify media items that correspond to a user input. The social-networking system 160 may receive, from a client device of a user, an input (e.g., a text string, a category selection) corresponding to one or more n-grams. The input need not originate from any action performed by the user, but may instead be automatically sent by the client device in response to a trigger (e.g., an event that occurs, a current time, a current location). The social-networking system 160 may access a media-item index. The media-item index may index a plurality of media items and one or more keywords associated with each media item. Each of the keywords may have been extracted from communications on the online social network (e.g., posts, reshares, comments, private messages) made by users of the online social network. The social-networking system 160 may identify media items from the media-item index. Each identified media item may be identified based on one or more of its associated keywords matching the one or more n-grams corresponding to the input of the user. The social-networking system 160 may calculate a media-item score for each of the identified media items. The media-item score may be based on any suitable factor, such as a number of occurrences in which the media item has been used in communications on the online social network in connection with its matched keywords. The social-networking system 160 may send, to the client device of the user for display, data corresponding to identified media items having a media-item score greater than a threshold media-item score. This data may include the media item itself, presented as a content object. Alternatively, it may be a link to the media item (e.g., on a third-party website). The data may be presented to the user as one or more suggestions, one or more of which the user may select for insertion in a communication. The media-item index may be leveraged for uses other than suggesting media items. As an example and not by way of limitation, the keywords associated with a media item may inform social-networking system 160 of the contextual meanings associated with the media item and may be used to rank posts (e.g., a post consisting only of a picture of President Barack Obama may be ranked highly with respect to a search for the n-gram "barack obama"). This may be useful in the search context. The media-item index may serve generally as a lexicon of the most current language, slang, and memes, keeping pace with their evolution over time and reflecting the most current usage. As another example and not by way of limitation, the keywords associated with media items may provide for a wealth of analytical or polling data (e.g., a company's logo may inform the company about user perceptions of the company).

The term "post" as used herein may include a publication authored by a user on a newsfeed page or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable page of the online social network, where the publication does not reference another publication on the online social network. As used herein, the term "reshare" may include a publication authored by a user on the online social network, where the publication references another publication on the online social network (e.g., the reshare may link to or embed a post). As used herein, the term "comment" may include a publication authored by a user on the online social network that responds to another publication on the online social network (e.g., a post or a reshare). The term may also include a reply to a comment. As used herein, the term "private message" may include any nonpublic messages between or among one or more users on the online social network. Collectively, these publications and messages, when they are associated with a media item, are referred to herein as "communications." For the purposes of this disclosure, a communication may be associated with a media item if it includes a media item, or is otherwise connected to a communication including a media item (e.g., a non-media-item post having a comment including a media item). As used herein, the term "communication thread" refers to a series of related communications, with an initial communication and a series of responsive communications (e.g., a post and all its associated comments, a message and all related messages whose relatedness is defined by a specified time period or by topic). While this disclosure focuses on describing the use of media-item indexes to suggest media items to a user, this disclosure contemplates using such indexes in other suitable contexts (e.g., ranking posts, generating analytics data, searching for media items). Furthermore, while this disclosure focuses on suggesting media items for communications, this disclosure contemplates suggesting media items for any suitable purpose (e.g., for making a personal note that is not to be communicated to another entity). Furthermore, while this disclosure focuses on describing communications on the online social network, the disclosure contemplates communications on any suitable platform (e.g., a text-messaging platform, an email platform, a Local Area Network).

In particular embodiments, the social-networking system 160 may receive an input corresponding to one or more n-grams. This input may be an input from a client device of a user. The user may be a user of the online social network. The input may be sent automatically, without any action by a user, in response to a trigger. As an example and not by way of limitation the input may be sent in response to a trigger that includes the current or past geo-location of the client device. As another example and not by way of limitation, the input may be sent in response to a trigger that includes the occurrence of an event (e.g., as determined based on comparing the current time with an event scheduled on a local or online calendar). The input may also be an action performed by the user of the client device with respect to the client device. The input may include a text string entered by the user. As an example and not by way of limitation, the user may have entered the text string "i love." The input may include the selection of an interactive element corresponding to a category. The social-networking system 160 may determine one or more n-grams that correspond to the input in any suitable manner. As an example and not by way of limitation, when a client device accesses the online social network from Peru, the social-networking system 160 may determine, for example, the n-grams "peru," "machu picchu," and "inca." As another example and not by way of limitation, when a current time (e.g., as determined by an internal clock in the client device or a clock in a different device) reaches midnight on New Year's Eve, the social-networking system 160 may determine, for example, the n-grams "new years," "party," and "celebration." As another example and not by way of limitation, in the case of an entered text string, the social-networking system 160 may parse the text string and determine one or more n-grams corresponding to the text string. As yet another example and not by way of limitation, in the case of a selection of an interactive element corresponding to the category "animals," the social-networking system 160 may determine one or more n-grams that are determined to be associated with that category (e.g., "animals," "dog," "lion," "nature"). A user input may include an indication that the user intends to socially interact with a communication. The indication may not include on its own any suggestion as to what media item the user may be interested in. As an example and not by way of limitation, the user may have activated a "comment" button corresponding to a post about voting (e.g., "I just voted"), indicating that the user intends to add a comment to the post. In such a case, the social-networking system 160 may determine n-grams corresponding to a user input based on the n-grams from the text of the post. In particular embodiments, the social-networking system 160 may use auto-suggestion or auto-correction functionality in determining the one or more n-grams corresponding to an input. As an example and not by way of limitation, as a user enters the text string "oba" or "oab," the social-networking system 160 may determine that the text string input corresponds to the n-grams "obama," "obara sand" (a character from the TV Show, Game of Thrones), or other suitable n-grams. In this example, the social-networking system 160 may also use text from the current communication thread to help determine the corresponding n-grams. As an example and not by way of limitation, the text string may have been entered as a comment to a post about President Barack Obama, in which case, the social-networking system 160 may determine that the text string input corresponds to the n-gram "obama" (and not to "obara sand"). Although this disclosure describes receiving particular inputs in a particular manner, this disclosure contemplates receiving any suitable inputs in any suitable manner.

Figures 3A, 3B:
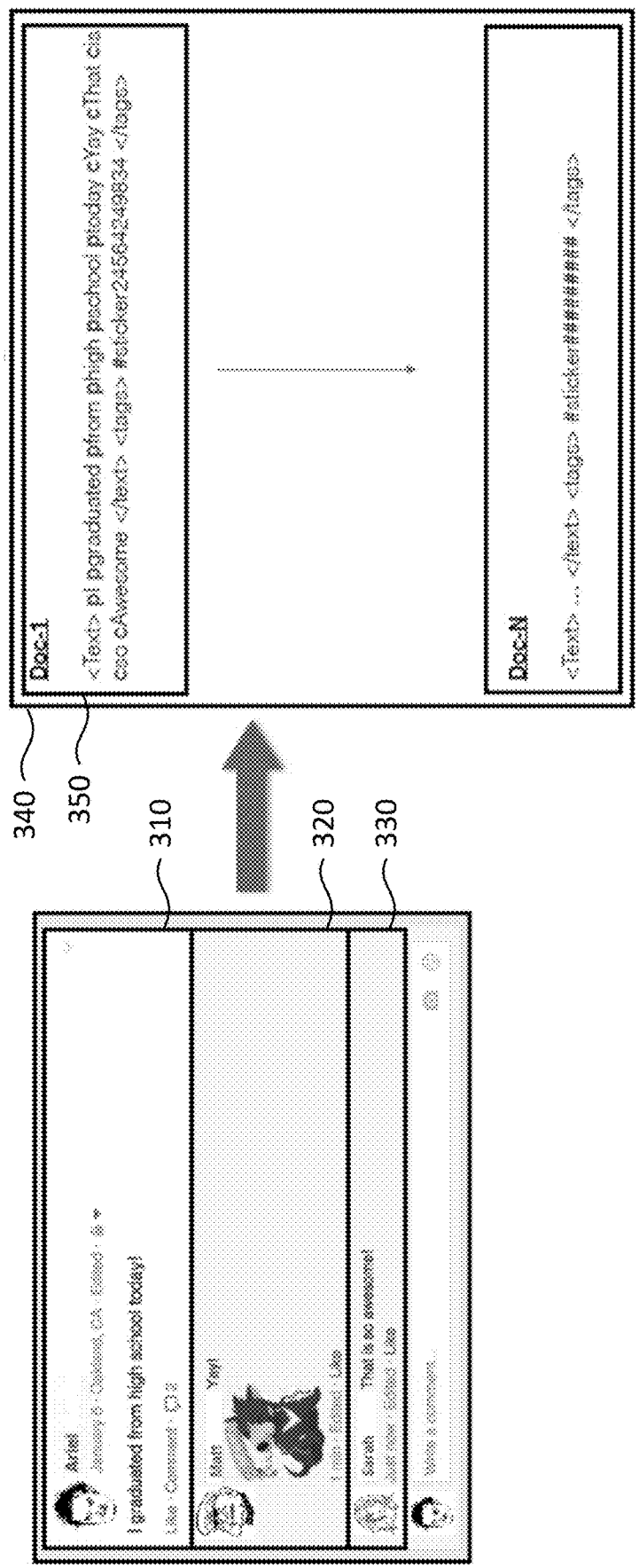
FIG. 3A illustrates an example of a communication thread associated with a particular media item.
FIG. 3B illustrates an example of a series of media documents containing n-grams from a plurality of communications, one of the media documents corresponding to the communication thread depicted in FIG. 3A.

In particular embodiments, the social-networking system 160 may access a media-item index. The media-item index may be indexed with a plurality of media items and one or more keywords associated with each media item. The media-item index may be pre-programmed with keywords associated. Additionally or alternatively, the media-item index may be dynamically populated over time based on communications authored by users of the social-networking system 160. The media-item index may be updated regularly (e.g., periodically). Alternatively or additionally, it may be updated when a threshold number of communications with media items is made. As an example and not by way of limitation, the media-item index may be updated when 200 new communications with media items, generally, have been made. As another example and not by way of limitation, the media-item index may be updated when 20 new communications have been made in association with a particular media item. The updating of the media-item index is advantageous in part because it may allow the social-networking system 160 to keep pace with the evolution of language and media-item usage over time. As an example and not by way of limitation, new slang and memes are continuously evolving, and much of this evolution is reflected in user communications on the online social network. A media-item index that updates itself based on these user communications may keep abreast of this development organically and may serve as a current lexicon for any suitable purpose. In particular embodiments, the social-networking system 160 may determine keywords by first accessing one or more communications. FIG. 3A illustrates an example of a communication thread associated with a particular media item. The post 310, authored by a user "Ariel" may be a post, for which users "Matt" and "Sarah" have provided comments 320 and 330, respectively. In particular embodiments, the social-networking system 160 may extract n-grams from one or more communications associated with a media item. The extracting of n-grams may involve the social-networking system 160 parsing the content and the metadata of a communication to identify one or more n-grams. In general, an n-gram may be a contiguous sequence of n items from a given sequence of text. The items may be characters, phonemes, syllables, letters, words, base pairs, prefixes, or other identifiable items from the sequence of text or speech. The n-gram may include one or more characters of text (letters, numbers, punctuation, etc.) in the content of a post or the metadata associated with the post. In particular embodiments, each n-gram may include a character string (e.g., one or more characters of text). In particular embodiments, an n-gram may include more than one word. As an example and not by way of limitation, referencing FIG. 3A, the social-networking system 160 may parse some or all of the text of the content or metadata of the post 310 (e.g., from the content "I graduated from high school today!") to identify n-grams that may be extracted. The social-networking system 160 may identify, among others, the following n-grams: i; i graduated; graduated from; high; high school; graduated from high school; today. Some or all of the n-grams may be extracted as keywords. For example, the n-grams "graduated," "graduated high school," and "high school" may be extracted. As another example and not by way of limitation, referencing FIG. 3A, social-networking system 160 may parse some or all of the text from the name of the author user of the post 310 (e.g., "Ariel") or metadata associated with the post (e.g., location of post: Oakland, Calif.; date posted: January 6). The social-networking system 160 may also parse text from content of a linked source (e.g., text from an linked article). In particular embodiments, the keywords may be optimized or corrected versions of extracted n-grams. As an example and not by way of limitation, the n-gram "recieve" (a misspelling of the word "receive") may be extracted as the keyword "receive." The social-networking system 160 may also consider context in determining the keywords to index, as determined by surrounding n-grams in a communication or communication thread. As an example and not by way of limitation, the social-networking system 160 may determine that the keyword "hear" should be extracted from the text "i here noises." As further described below, the media-item index may keep track of the communication type of the communication from which a keyword was extracted. Although this disclosure describes accessing a particular index in a particular manner, this disclosure contemplates accessing any suitable index in any suitable manner.

In particular embodiments, the social-networking system 160 may extract and aggregate n-grams from related communications into a media document corresponding to a media item. As an example and not by way of limitation, a media document may include a single series of related communications, such as a single communication thread. FIG. 3B illustrates an example of a series of media documents containing n-grams from a plurality of communications, one of the media documents corresponding to the communication thread depicted in FIG. 3A. As an example and not by way of limitation, referencing FIGS. 3A and 3B, n-grams from the contents of post 310 and comments 320 and 330 may be extracted into the media document 350. The media document 350 may include n-grams from an entire series of related communications (e.g., a communication thread). A media document may be created to correspond to an individual media item. As an example and not by way of limitation, referencing FIGS. 3A and 3B, the media document 350 may correspond to the sticker from the post 320, and may accordingly include a sticker identifier (e.g., "#sticker24564249834"). A media document may include n-grams from multiple communication threads that share the same media item. As an example and not by way of limitation, referencing FIG. 3B, the media document 350 may include n-grams from several communication threads not shown, where each of the communication threads included the sticker corresponding to #sticker24564249834. There may be at least one such media document for every sticker, illustrated in FIG. 3B as a set of N media documents 340. Likewise, there may be such sets of media documents for every other type of media item. A media document may alternatively correspond to only a single series of related communications (e.g., a single communication thread). As an example and not by way of limitation, referencing FIGS. 3A and 3B, the media document 350 may only include n-grams extracted from the communication thread represented by the post 310 and the comments 320 and 330. In this example, there may be one or more other media documents corresponding to the same sticker from the comment 320 that include n-grams from their respective corresponding communication threads. A media document may include only communications within a threshold distance of a respective media item. As an example and not by way of limitation, if a media item is posted in comment number ten in a communication thread and the threshold distance is set to five, only comments five through fifteen may be included in the respective media document. A media document may be split into multiple media documents when the number of communications exceeds a maximum number (e.g., for efficiency, storage, accessibility, or other feasibility purposes). As an example and not by way of limitation, a post having more than 100 comments may be split into more than one media document (e.g., 50 comments in one media document, 50 comments in another; all 100 comments in one media document, all future comments in another). The maximum number may alternatively correspond to the number of extracted n-grams, irrespective of the number of communications. Alternatively, a media document may be created solely to correspond to an individual series of related communications, and may as a result include more than one media item. As an example and not by way of limitation, n-grams extracted from an individual series of related communications containing two different GIFs may be placed into a single media document corresponding to the series of related communications. Although not shown in FIGS. 3A and 3B, metadata associated with communications may also be extracted as n-grams. The metadata associated with a communication may include the name of the user who authored the communication, (e.g., "Ariel"), the date and time associated with the post (e.g., "January 6"), a location associated with the post ("Oakland, Calif."). The metadata associated with the post may also include blurbs, titles, or URLs of any external webpage linked in the post, as well as information regarding the authors, topics, or sponsorship associated with the post or external content (which may either be retrieved from the external content or provided by the external-content provider as pre-tagged information associated with the post). In particular embodiments, the social-networking system 160 may also extract n-grams from non-textual content. As described below, media items may be associated with n-grams. This association may be pre-programmed (e.g., a smiley face may have associated with it the keyword "happy") or may be obtained through previous associations, stored as keywords in the media-item index. As an example and not by way of limitation, the social-networking system 160 may extract, from a comment associated with an audio-file media item, the n-gram "sad" due to the presence of a "sad face" emoji in the content (the "sad face" emoji being associated with the n-gram "sad" in the media-item index). The social-networking system 160 may extract n-grams from a communication when it is first authored by a user. Alternatively or additionally, the social-networking system 160 may extract the n-grams when a threshold number of communications have been authored (e.g., every time 100 new communications have been authored, every time 5 new communications associated with a particular media item have been authored). The social-networking system 160 may also extract other relevant information such as the number of "likes" or shares associated with the communication, the number of views associated with the post, other suitable data associated with the post, or any combination thereof. This information may be an indicator of a communication's relevance (e.g., a post with many shares may likely be relevant, while a post with few likes may likely be an arbitrary comment having nothing to do with a media item or the discussion, generally), and ultimately may be an indicator of the communication's descriptiveness with respect to a media item. The social-networking system 160 may also keep track of a communication type associated with a keyword, i.e., the type of communication from which the keyword was extracted. As an example and not by way of limitation, referencing FIGS. 3A and 3B, the social-networking system 160 may prepend all n-grams in media document 350 that were extracted from posts with the letter "p" (e.g., "pgraduated") and comments with the letter "c" (e.g., "cAwesome"). In particular embodiments, the social-networking system 160 may select keywords for extraction from the n-grams in media documents. The selected keywords may be indexed with their respective media items in the media-item index, as described above.

In particular embodiments, the keywords that are indexed with a media item may be a subset of the set of n-grams extracted from communications including the media item, or otherwise associated with the media item. As an example and not by way of limitation, certain n-grams from the n-grams in a media document may be extracted as keywords. As another example and not by way of limitation, the social-networking system 160 may extract keywords directly from communications, without first creating media documents. As an example and not by way of limitation, one or more n-grams may be extracted from a communication (e.g., when it is first authored, when a threshold number of communications have been authored), one or more keywords may be selected from the extracted n-grams, and the resultant keywords may be indexed with an associated media item. The keywords may be selected based on a term frequency-inverse document frequency (TF-IDF) analysis of the content of the post in relation to a set of posts. The TF-IDF is a statistical measure used to evaluate how important a word is to a document (e.g., a post) in a collection or corpus (e.g., a set of posts). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t, d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. As an example and not by way of limitation, referencing FIG. 3A, a TF-IDF analysis of the text of the post 310 may determine that the n-grams "graduated" and "high school" should be extracted, where these n-grams have high importance within the post 310. Similarly, a TF-IDF analysis of the post 310 may determine that the n-grams "i" and "from" should not be extracted, where these n-grams have a low importance within the post 310 (because these are common terms in many posts). Although this disclosure describes extracting particular n-grams from particular content and metadata in a particular manner, this disclosure contemplates extracting any suitable n-grams from any suitable place in any suitable manner.

In particular embodiments, the media-item index may be created using one or more of the features of the deep-learning model described in co-pending U.S. patent application Ser. No. 14/949,436, filed 23 Nov. 2015, which is incorporated by reference. As an example and not by way of limitation, each of the media items in the media-item index may correspond to an embedding in a multi-dimensional embedding space (e.g., a d-dimensional embedding space). Media items may each be mapped to a respective vector representation using, for example and not by way of limitation, a dictionary generated by the deep-learning model. Each of the vector representations may be a vector in $\mathbb{R}^d$, where $\mathbb{R}$ denotes the set of real numbers and d is a hyperparameter that controls capacity. Each vector representation for a media item may correspond to an embedding in the embedding space. As an example and not by way of limitation, coordinates for a point in the embedding space may be determined based on each vector representation. The embedding space may also include embeddings of a plurality of n-grams. An embedding for a particular media item may be at a location in the embedding space that is within a threshold distance of embeddings of relevant n-grams (e.g., n-grams that are frequently used with the media item, n-grams that are pre-determined to be associated with the media item). In particular embodiments, the media-item index may be populated by accessing the embedding space.

In particular embodiments, the media-item index may be, at least initially, populated from communications of certain languages. As an example and not by way of limitation, the media-item index may be populated using one or more languages in which media items or particular types of media items are most frequently used. As an example and not by way of limitation, if media items are most frequently used in communications in the English language, the media-item index may be initially populated with keywords from English communications. In particular embodiments, there may be separate media-item indexes for each language or separate media-item indexes for different groups of languages. In particular embodiments, a media-item index may initially be populated with keywords from communications of a particular language, but may later be updated with keywords from communications of other languages. In particular embodiments, the language indexed first may depend on the individual media item. As an example and not by way of limitation, a media item that is used most often in communications in the Greek language may be indexed with Greek keywords first, while a media item used most often in communications in the Swahili language may be indexed with Swahili keywords first. In particular embodiments, the media-item index may be populated in a similar manner based on locations associated with communications, demographics associated with communications (e.g., extracting keywords from communications by certain age groups), or any other suitable groupings of communications.

In particular embodiments, the social-networking system 160 may identify one or more media items from the media-item index. Each of the media items may be identified based on one or more of its associated keywords matching the one or more n-grams corresponding to the input. As an example and not by way of limitation, the social-networking system 160 may identify media items indexed with keywords matching the one or more n-grams corresponding to the input. A keyword need not be an exact match with the one or more n-grams. As described below, the social-networking system 160 may accommodate a wide spectrum of matches, with the degree of matching going only to the quality of the match (which, as described below, will go toward calculating a media-item score). As an example and not by way of limitation (and as further explained below), the keyword "12th grade" may be a match for the n-gram "high school" because they may both be closely related to the topic "High School" or the topic "12th Grade." Although this disclosure describes identifying particular items in a particular manner, this disclosure contemplates identifying any suitable items in any suitable manner.

Figure 4:
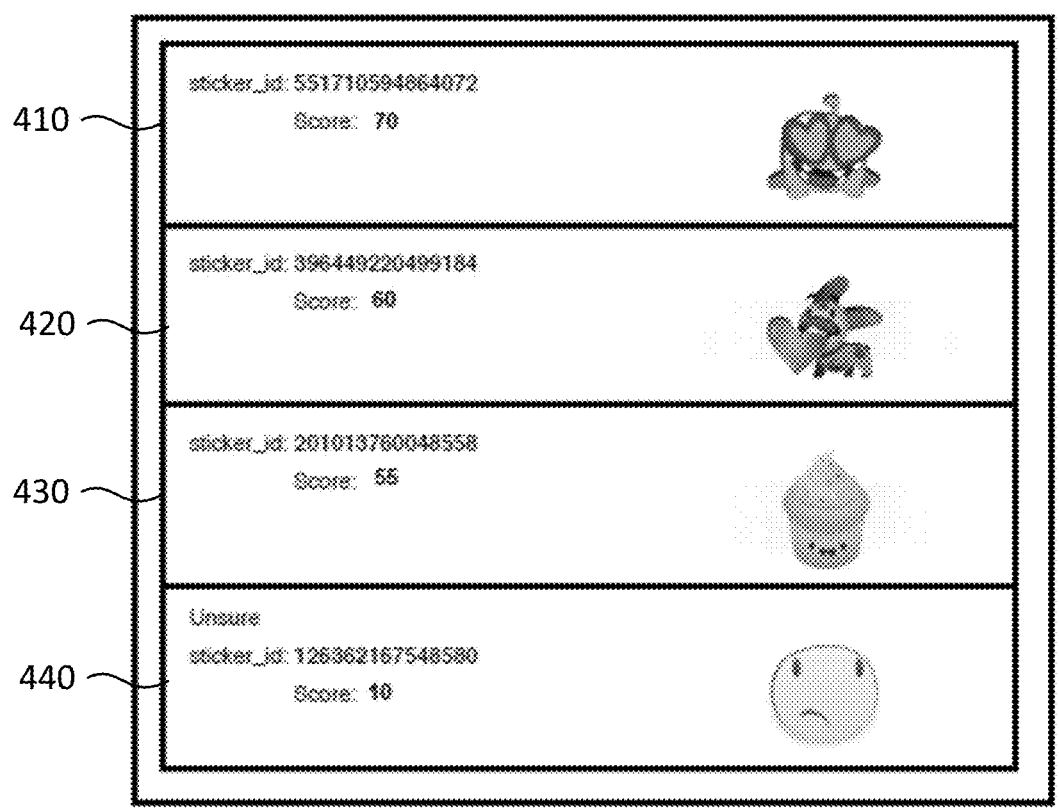
FIG. 4 illustrates a set of media items for which media-item scores have been calculated.

In particular embodiments, the social-networking system 160 may calculate a media-item score for each of the identified media items based on one or more factors. FIG. 4 illustrates a set of media items for which media-item scores have been calculated. As an example and not by way of limitation, referencing FIG. 4, the media-item scores of media items 410, 420, 430, and 440 may have been calculated in response to an input corresponding to the n-gram "i love." The media-item score may be adjusted proportionally to the factors in an optimal manner, each factor being weighted appropriately. The media-item score may be based on a number of occurrences in which the media item has been used in communications on the online social network in connection with its matched keywords. As an example and not by way of limitation, referencing FIG. 3A, if the sticker in the comment 320 has often been used with n-grams matching the keyword "graduated," the sticker may receive a high media-item score when there is a current match with the keyword "graduated." In particular embodiments, the media-item score may be based on a quality of the match between the one or more n-grams corresponding to the input and keywords associated with the respective media item. The quality of the match may be based on a relationship between the topics associated with the one or more n-grams and the topics associated with the keywords corresponding to the media item. As an example and not by way of limitation, the keyword "graduated" may be a medium-quality match for the n-gram "study," because their respective topics may be only weakly associated. As another example and not by way of limitation, the keyword "graduated" may be a high-quality match for the n-gram "ceremony," because their respective topics may be strongly associated. More information on topic association may be found in U.S. patent application Ser. No. 13/167,701, filed 23 Jun. 2011, and U.S. patent application Ser. No. 14/585,782, filed 30 Dec. 2014, each of which is incorporated by reference. The quality of the match may be based on a ratio or number of characters that match each substantially matching n-gram associated with the trending topic. As an example and not by way of limitation, the social-networking system 160 may determine a high-quality match between the n-gram "graduation" and the keyword "graduated." The social-networking system 160 may determine the quality of the match based on the edit distance between an n-gram and a keyword. Edit distance is a way of quantifying how dissimilar two strings (e.g., words) are to one another by counting the minimum number of operations required to transform one string into the other (e.g., the number of characters that need to be changed and the relative position of the characters). As an example and not by way of limitation, the n-gram "john wanye" may be a high-quality match for the keyword "john wayne" because only a single operation is required to transform "wanye" into "wayne" (a switch of the characters "n" and "y" in "wanye"), and by contrast, may be a low-quality match for the keyword "lil wayne" because five operations are required to transform "john wanye" into "lil wayne." In particular embodiments, the media-item score may be based on a definition of the media item, which may be a textual description of the media item (e.g., including a series of n-grams). The definition of the media item may be, or may include, a pre-set definition. As an example and not by way of limitation, a library may have been curated within an index of the social-networking system 160 matching various media items with a textual description (e.g., a Lord of the Rings sticker may have been curated to match the n-grams "one ring to rule them all," "mordor," and "hobbits"). Additionally or alternatively, the definition of the media item may be created or updated dynamically based on n-grams or keywords that were used in communications or communication threads including the media item. As an example and not by way of limitation, the social-networking system 160 may access the media-item index, identify the set of keywords corresponding to a particular media item, identify a subset of the keywords that includes a definition-threshold number of keywords (e.g., the top ten keywords most frequently used in association with the media item), and then determine a definition for the media item by concatenating the identified subset. The definition may also include, for example, n-grams taken separately from metadata associated with the media item (e.g., the filename of a video) or from text at a third party website (e.g., text from an article from which the media item was linked), whether or not these n-grams were in the media-item index. A media item may receive a relatively high media-item score if the one or more n-grams corresponding to the user input are a close match to the definition of the media item. A media item may have a personalized definition, tailored to the user of the client device sending the input. This personalized definition may be used alternatively or additionally to the non-personalized definition in determining the media-item score. The personalized definition for the user may be based on profile information associated with the user. As an example and not by way of limitation, the profile information may include location information (e.g., a hometown, a country/city the user has lived in, a country/city the user now lives in). If the user lives in Delhi, India, for example, the personalized definition may include n-grams in Hindi. As another example and not by way of limitation, the profile information may include information about n-grams the user frequently uses in communications with a particular media item or a particular set of media items (e.g., the user may have a dog named Shasta and may frequently use the n-gram "shasta" in communications with emojis representing dogs). As yet another example and not by way of limitation, the profile information may include demographical information of the user (e.g., age, nationality, gender). The personalized definition for the user may be based on device information associated with the client device of the user. As an example and not by way of limitation, the device information may include location information (e.g., a country/city in which the device has been, a country/city in which the device currently is). The media-item score may be based on a sentiment analysis of a current communication thread with which the input is associated. As an example and not by way of limitation, the social-networking system 160 may determine that a current thread is associated with a sad sentiment and may accordingly raise the media-item scores of media items associated with the sad sentiment (e.g., based on the definition of the media item). Although this disclosure describes calculating a media-item score for media items in a particular manner, this disclosure contemplates scoring media items in any suitable manner.

The media-item score may be based on information associated with the user of the client device. The information associated with the user may include, for example, demographic information, geographic information, a language associated with the user, a history of the author user's past activity, a group associated with the user on or off the online social network, or any other suitable information associated with the user. This information may be part of the user's profile information. As an example and not by way of limitation, a 70-year old user may enter an input that corresponds to the n-gram "Wayne" in reference to John Wayne (a relatively old movie actor), a 40-year old user may specify the same in reference to Wayne's World (the relatively newer movie), and a 20-year old user may specify the same in reference to Lil Wayne (the even newer music artist). In this example, media-item scores may be appropriately adjusted based on the age of the user of the client device submitting the input. The media-item score may be based on information associated with the client device itself, such as hardware and software configurations, device settings, and any other suitable device information. As an example and not by way of limitation, an audio file may receive a relatively low media-item score if the client device does not have speakers. The media-item score may be based on usage of media items by connections (e.g., first-degree social network connections) of the user. As an example and not by way of limitation, if a user's friends frequently insert video files of a TV show into communications, the media-item score for media items related to that TV show may be relatively high. The media-item score may be based not only on the general usage of media items by connections of the user, but also the identity of the participants in a current communication thread. As an example and not by way of limitation, if a user's family members have an inside joke that includes a picture of a fish-human hybrid, in a communication thread involving the user's family members, a media item depicting the fish-human hybrid may receive a relatively high score. The media-item score may be based on a language associated with a current communication thread with which the input corresponding to the one or more n-grams is associated. As an example and not by way of limitation, for a communication thread about a high school graduation that is mostly in French, a sticker depicting the text "Congratulations!" may receive a lower score than a sticker depicting the text "Félicitations!" (which is the French equivalent of "congratulations"). As another example and not by way of limitation, media items that are more common among French-speakers (e.g., an image of a French flag) may receive a relatively high score in a communication that is mostly in French. The media-item score may be based on historical usage of media items by the user. As an example and not by way of limitation, a particular media item (or media items related to the particular media item) may receive a relatively high score if the user frequently uses the particular media item. As another example and not by way of limitation, a user may frequently use a sticker that depicts a fish-human hybrid in communication threads including an n-gram corresponding to a particular celebrity, in which case the media-item score for the sticker of the fish-human hybrid may receive a relatively high media-item score in such communication threads, whether or not the sticker is indexed with a keyword corresponding to the particular celebrity. The media-item score may be based on determined preferences of the user, the preferences indicating what media items the user may prefer. The user's preferences may be determined by the social-networking system 160 based on the user's profile information, history of interactions with content, activity on the online social network, activity on a third-party website, or any other suitable information. As an example and not by way of limitation, if the user is a member of a bowling group on the online social network, an input corresponding to the n-gram "strike" may cause the social-networking system 160 to calculate a higher media-item score for a media item related to bowling than for a media item related to baseball. As another example and not by way of limitation, if the user frequently authors posts on the online social network about dogs or frequently views articles about dogs, an input corresponding to the n-gram "whiskers" may cause the social-networking system 160 to calculate a higher score to a media item associated with a dog than for a media item associated with a cat.

The media-item score may be based on the source of the keywords with which there has been a match. As an example and not by way of limitation, a match with keywords sourced from posts may be weighted less than a match with keywords sourced from comments. As discussed above, keywords may be distinguished by their source by prepending them with an appropriate character (e.g., "c" for comment, "p" for post), although any other suitable methods may be used (e.g., storing keywords with metadata indicating a source). Distinguishing among sources may be useful, for example, because some sources may provide more description than others. As an example and not by way of limitation, a comment may provide more description than a post. For example, a post may include an audio file with no accompanying text, while a comment to the post might read "wow, I love Fidelio—Beethoven," in reference to the name and title of the song and composer sampled by the audio file. The media-item score may be based on the social signals associated with the source of the keywords with which there has been a match. As an example and not by way of limitation, a match with a keyword extracted from one or more comments associated with a high number of likes may yield a higher media-item score than if the keyword had been extracted from one or more comments with few social signals. This may be useful, for example, because a communication with a high number of social signals may indicate that its contents are descriptive and not arbitrary (e.g., a comment made by someone who is mistaken or not informed as to the meaning of an associated media item). The media-item score may be based on information (e.g., demographical information) associated with the entities from whose communications the associated keywords are indexed in the media-item index. This may be useful, for example, in situations where people of particular demographics are more adept at describing certain media items. As an example and not by way of limitation, a keyword extracted from a five-year old with respect to a media item related to the theory of special relativity may be weighted less than a keyword with respect to the same media item extracted from a thirty-year old. The media-item score may also be based on a comparison of information associated with the user and information associated with the entities from whose communications the associated keywords are indexed. This may be useful, for example, because people of different demographics may view or describe things differently. For example, people of a particular age group may use the term "bad" to mean "good" (as in the popular Michael Jackson song, "Bad"). As an example and not by way of limitation, when a user of that age group enters an input corresponding to the n-gram "bad," a media item indexed with the keyword "good" from users of a different age group may be a high-quality match.

In particular embodiments, the social-networking system 160 may compare patterns in the current communication thread associated with the input with patterns in previous communications on the online social network. The result of such comparison may affect the media-item score. As an example and not by way of limitation, the social-networking system 160 may consider patterns in the usage of media items (e.g., which may be recorded in the media-item index or respective media documents). In doing so, the social-networking system 160 may consider the order in which media items are used with relation to the presence of keywords extracted from n-grams. For example, a media item depicting a "thumbs-up" may be frequently posted by users of the online social network after the n-gram of a recent movie. Consequently, in the same example, the social-networking system 160 may calculate a relatively high media-item score for the "thumbs-up" media item when there has been an incidence of the n-gram for that recent movie in the communication thread. This may be useful in communication threads that only include media items with no associated text that may be matched with keywords in the media-item index. For example, if a "thumbs-up" media item often follows as a reply to a particular audio file, the "thumbs-up" media item may receive a relatively high score in a current communication thread where the same audio file was just posted. In particular embodiments, the social-networking system 160 may, additionally or alternatively, use the definition of a media item, as determined by the keywords in a media-item index. As an example and not by way of limitation, referencing FIG. 4, the media item 420 may be indexed with 50 keywords, the top five keywords being "dog," "love," "heart," "cute," and "play." If the definition-threshold number is set at five, the social-networking system 160 may, accordingly determine a definition for the media item 420. Accordingly, if a communication thread includes a post with the media item 420, the social-networking system 160 may interpret the communication thread as including the n-grams "dog," "love," "heart," "cute," and "play."

In particular embodiments, the social-networking system 160 may send for display (e.g., to the client device of the user), data corresponding to one or more of the identified media items. Data corresponding to a media item may include the media item itself as a content object (e.g., a content object natively stored on a server machine of the social-networking system 160), a reference to the media item (e.g., a link to a media item present on a server of the social-networking system 160 or on a third-party server), or any other suitable data allowing for the representation of the media item. As mentioned above, the input may be received as the user is entering a text string (e.g., "oba") using the client device. Data may be send to the client device upon receiving that text string as an input. The result may be described as a typeahead-like functionality for media items. The social-networking system 160 may only send data corresponding to one or more media items having a media-item score greater than a threshold media-item score. As an example and not by way of limitation, referencing FIG. 4, the social-networking system 160 may only send data corresponding to media items with media-item scores greater than 60 (e.g., media items 410 and 420). The media-item score may be a rank and the threshold media-item score may be a threshold rank. As an example and not by way of limitation, again referencing FIG. 4, the social-networking system 160 may only send data corresponding to media items with media-item ranks greater than 4 (e.g., media items 410, 420, and 430). Although this disclosure describes sending particular data in a particular manner, this disclosure contemplates sending any suitable data in any suitable manner.

In particular embodiments, the deep-learning model described above and incorporated herein may be used to identify and determine which media items to send for display. The social-networking system 160 may access the multi-dimensional embedding space generated using the deep-learning model. As an example and not by way of limitation, the social-networking system 160 may use a search algorithm to identify one or more embeddings of media items that are located at respective points within a threshold distance of a point corresponding to an embedding of the one or more n-grams corresponding to the user input. The social-networking system 160 may then determine that one of more media items associated with the identified embeddings are relevant to the one or more n-grams corresponding to the user input. The social-networking system may take into account the same factors described above in the context of scoring media items (e.g., demographic information of the user). The social-networking system 160 may send the one or more relevant media items for display.

In particular embodiments, the social-networking system 160 may use the media-item index to understand and rank posts (or other communications) in other contexts such as post searching or newsfeed generation. As an example and not by way of limitation, for a post that contains only a media item, the social-networking system 160 may treat the definition of the media item (determined based on the keywords with which the media item is indexed) as n-grams of the post. In the same example, referencing FIG. 4, if the post included the media item 420, the social networking system may treat the post as including, for example, the n-grams "dog," "love," "heart," "cute," and "play." In the same example, in response to a search query for posts about cute dogs (e.g., "cute dogs," "posts with cute dogs," "posts with dogs that are cute") social-networking system 160 may access the post with the media item 420, rank it against other posts based on a content-ranking algorithm, and return it as a search result. In this way, the media-item index may effectively make communications with media items searchable based on the media items. As another example and not by way of limitation, a page on the online social network (e.g., a trending-topics page) related to a new movie might display a post including a video of a trailer of the movie based on the definition associated with the video.

In particular embodiments, the social-networking system 160 may concatenate the n-grams or keywords frequently used or otherwise associated with a media item (e.g., within the media-item index) in any suitable order to compose a sentence-representation of the post (e.g., "cute dog love heart play"). The sentence-representation may include a set of keywords from the definition associated with a media item. This type of sentence-representation may have various uses. As an example and not by way of limitation, a hearing impaired user may be able to read the sentence-representations of posts with audio files to gain an understanding of what the post means. In such cases, the social-networking system 160 may automatically send sentence-representations of media items including sound to the user (e.g., based on profile information of the user, based on a device setting). As another example and not by way of limitation, a client device may not be capable of playing videos, in which case the social-networking system 160 may send a sentence-representation of media items including video. Alternatively or additionally, the user may be able to select an interactive element that triggers the display of the sentence-representation.

In particular embodiments, the social-networking system 160 may use the media-item index to generate analytical data about the usage of media items, which may be provided to any interested entity (e.g., a third party associated with a media item). As an example and not by way of limitation, Acme Coffee Shop may be interested in knowing what ideas users associate with its brand or products. In this example, the social-networking system 160 may provide to Acme Coffee Shop data about the occurrence of media items in communications (e.g., posts, comments, messages) by users of the online social network that also include the n-gram "acme strawberry-mocha coffee." For example, the social-networking system 160 may compile a report that includes twenty "thumbs-up" stickers, three "thumbs-down stickers," and five videos of an Acme Coffee Shop commercial. As another example and not by way of limitation, the social-networking system 160 may provide Acme Coffee Shop data about the occurrence of different n-grams in communications including media items associated with Acme Coffee Shop. For example, the social-networking system 160 may compile a report that includes the number of occurrences in communications of the n-grams "refreshing" and "disgusting" associated with an image of an Acme Strawberry-Mocha Coffee. The social-networking system 160 may also leverage the media-item index to harness polling data with respect to the content of specific media items. As an example and not by way of limitation, the social-networking system 160 may provide to Acme Coffee Shop data on the occurrence of n-grams and media items in communications including a video of Acme Coffee Shop's new advertisement (e.g., five occurrences of "terrible," ten occurrences of "corny," two occurrences of a smiley-face emoji). The reports may include other relevant information such as demographic or geographic information. In this example, the social-networking system 160 may also provide to Acme Coffee Shop whole sentences from communications. The social-networking system 160 may anonymize the communications to maintain privacy (e.g., by removing all information identifying users associated with the communications, by removing all names included in the text of the communications).

The social-networking system 160 may also provide to moderators or administrators (either of the online social network or of third-party websites), or to any other interested party, n-grams associated with media items to provide some context for determining what media items might mean. As an example and not by way of limitation, a website moderator might not realize that a sticker posted by a user has an offensive meaning, but may be able to figure it out by the associated n-grams, which may have offensive connotations. Alternatively, the social-networking system 160 may provide data about the media items associated with certain n-grams to help determine what the n-grams mean. As an example and not by way of limitation, a website moderator may come to understand that the n-gram "jar jar binks" is related to the movie franchise Star Wars if it is frequently used in conjunction with media items associated with Star Wars. This functionality may also be used in content filters, which may be able to automatically filter out media items associated with black-listed n-grams.

Figure 5:
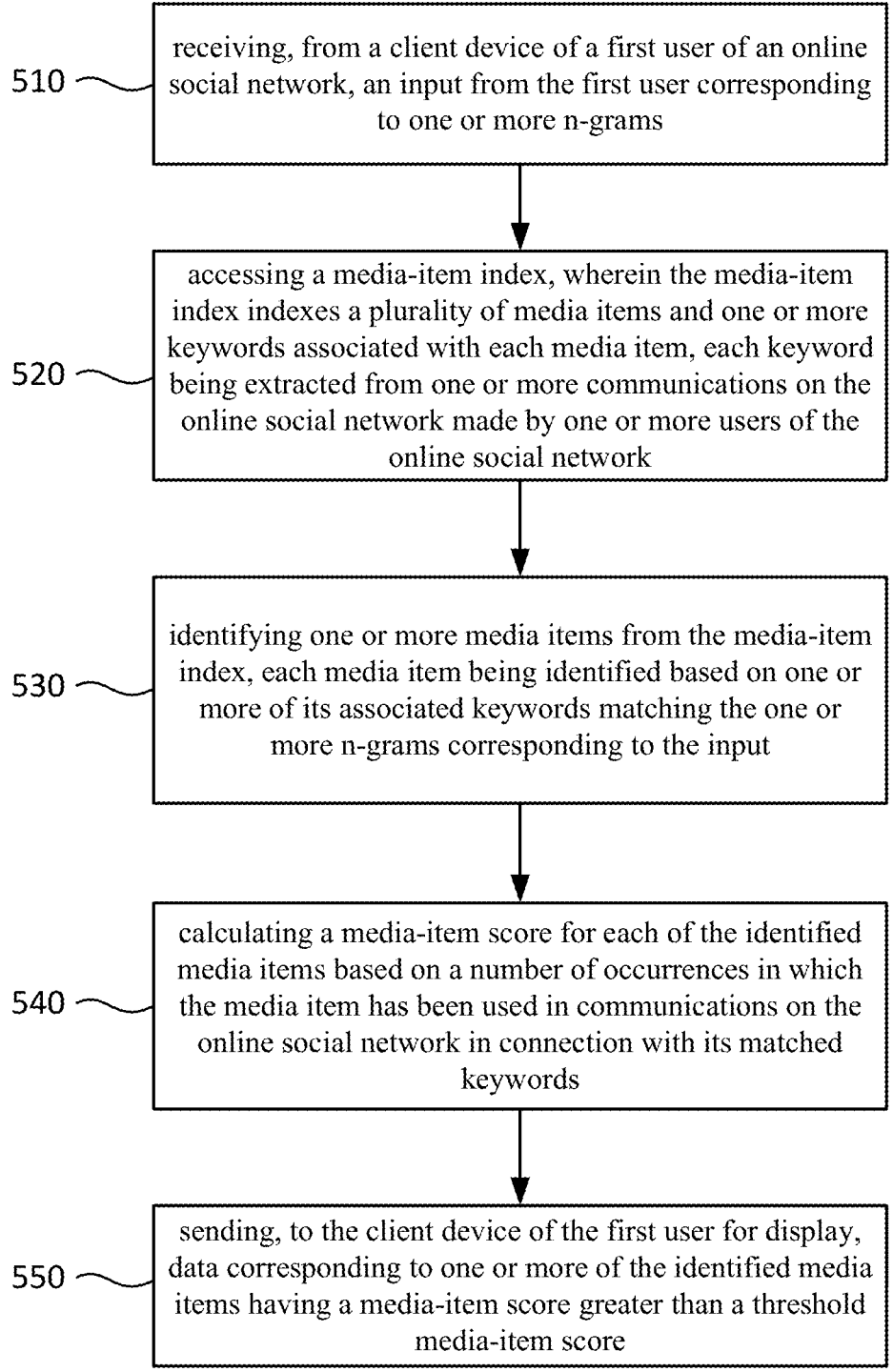
FIG. 5 illustrates an example method for sending data corresponding to media items based on a user input.

FIG. 5 illustrates an example method 500 for sending data corresponding to media items based on a user input. The method may begin at step 510, where the social-networking system 160 may receive, from a client device of a first user of an online social network, an input from the first user corresponding to one or more n-grams. At step 520, the social-networking system 160 may access a media-item index, wherein the media-item index indexes a plurality of media items and one or more keywords associated with each media item, each keyword being extracted from one or more communications on the online social network made by one or more users of the online social network. At step 530, the social-networking system 160 may identify one or more media items from the media-item index, each media item being identified based on one or more of its associated keywords matching the one or more n-grams corresponding to the input. At step 540, the social-networking system 160 may calculate a media-item score for each of the identified media items based on a number of occurrences in which the media item has been used in communications on the online social network in connection with its matched keywords. At step 550, the social-networking system 160 may send, to the client device of the first user for display, data corresponding to one or more of the identified media items having a media-item score greater than a threshold media-item score. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for sending data corresponding to media items based on a user input including the particular steps of the method of FIG. 5, this disclosure contemplates any suitable method for sending data corresponding to media items based on a user input including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 6:
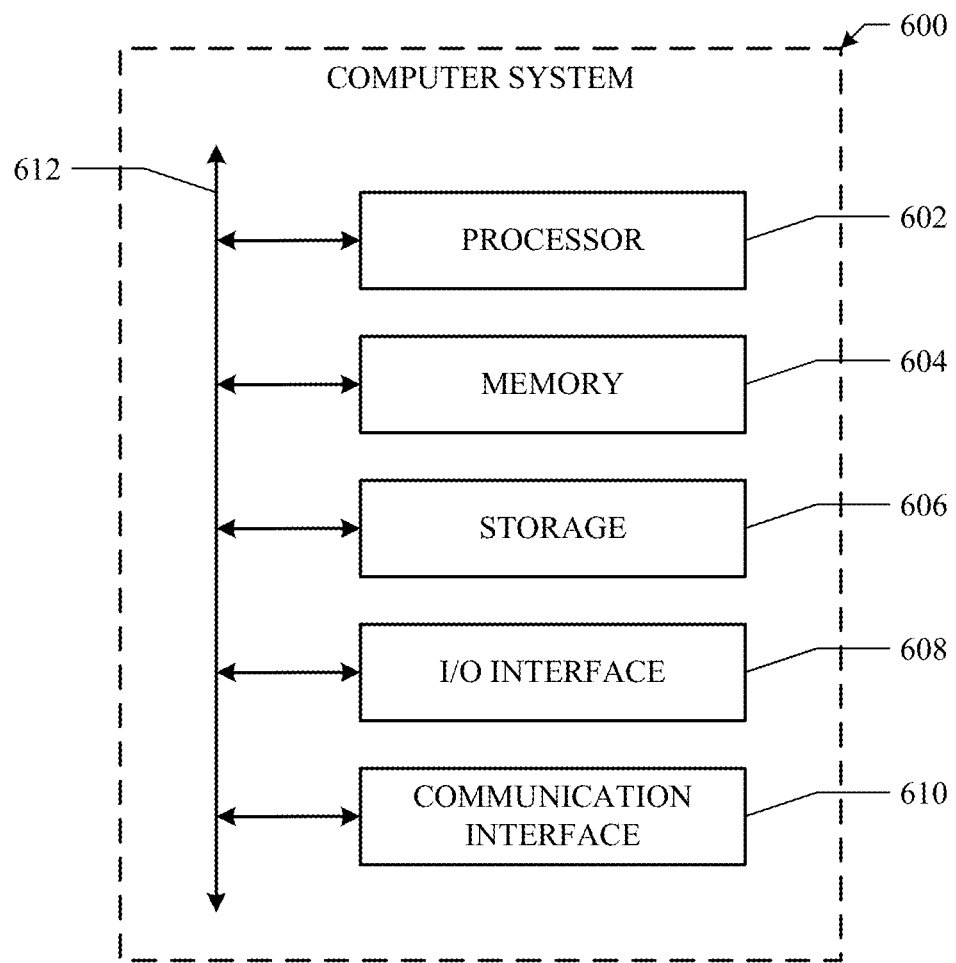
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, from a client device, an input comprising one or more n-grams;
   identifying one or more media items from a media-item index, wherein the media-item index indexes a plurality of media items and one or more respective keywords associated with each media item, each media item being identified based on one or more of its associated keywords matching at least one of the one or more n-grams of the input;
   calculating a respective media-item score for each of the identified media items; and
   sending, to the client device, instructions for presenting one or more of the identified media items having respective media-item scores greater than a threshold media-item score.

2. The method of claim 1, wherein the one or more respective keywords associated with each media item are derived from one or more communications on a network.

3. The method of claim 2, wherein the network is an online social network, and the one or more communications are generated by one or more users of the online social network.

4. The method of claim 3, wherein the respective media-item score of each identified media item is based on demographic information of the one or more users.

5. The method of claim 2, wherein the one or more respective keywords associated with each media item comprise information about a communication type of the respective communication from which the one or more respective keywords were derived.

6. The method of claim 1, wherein the respective media-item score of each identified media item is based on a number of occurrences of the media item in communications on a network in connection with its associated keywords matching at least one of then-grams of the input.

7. The method of claim 1, wherein the identified media items comprise one or more of a sticker, an emoticon, an image, a video file, or an audio file.

8. The method of claim 1, wherein the input comprises a selection of a category, the selection being performed in connection with a communication by a user of the client device.

9. The method of claim 1, wherein the plurality of media items comprises a plurality of media documents, each media document being associated with a single communication thread and including a particular media item and one or more n-grams used in one or more communications within the associated communication thread.

10. The method of claim 1, wherein the sending of the one or more identified media items comprises sending a link to a respective instance of one or more of the identified media items.

11. The method of claim 1, further comprising:
    determining, for each identified media item, a definition of the media item based on a subset of its associated keywords, the subset comprising a threshold number of associated keywords that have been used most frequently in one or more communications including the respective media item.

12. The method of claim 11, wherein the definition of the respective media item is personalized for a user of the client device based on location information associated with the user.

13. The method of claim 11, wherein a media-item score of the respective media item is further based on the definition of the media item.

14. The method of claim 1, wherein the respective media-item score of each identified media item is based on a usage of the identified media item by one or more first-degree connections of a user of the client device on an online social network.

15. The method of claim 1, wherein the respective media-item score of each identified media item is based on a language associated with a communication thread with which the input is associated.

16. The method of claim 1, wherein the respective media-item score of each identified media item is based on a sentiment analysis of a communication thread with which the input is associated.

17. The method of claim 1, wherein the respective media-item score of each identified media item is based on demographic information or user preferences of a user of the client device.

18. The method of claim 1, wherein the respective media-item score of each identified media item is based on historical usage of media items by a user of the client device.

19. One or more computer-readable non-transitory storage media embodying software that is operable when executed to:
- receive, from a client device, an input comprising one or more n-grams;
- identify one or more media items from a media-item index, wherein the media-item index indexes a plurality of media items and one or more respective keywords associated with each media item, each media item being identified based on one or more of its associated keywords matching at least one of the one or more n-grams of the input;
- calculate a respective media-item score for each of the identified media items; and
- send, to the client device, instructions for presenting one or more of the identified media items having respective media-item scores greater than a threshold media-item score.

20. A system comprising: one or more processors; and a non-transitory memory coupled to the processors comprising instructions executable by the processors, the processors operable when executing the instructions to:
- receive, from a client device, an input comprising one or more n-grams;
- identify one or more media items from a media-item index, wherein the media-item index indexes a plurality of media items and one or more respective keywords associated with each media item, each media item being identified based on one or more of its associated keywords matching at least one of the one or more n-grams of the input;
- calculate a respective media-item score for each of the identified media items; and
- send, to the client device, instructions for presenting one or more of the identified media items having respective media-item scores greater than a threshold media-item score.

* * * * *